(12) United States Patent
Swart et al.

(10) Patent No.: US 11,927,126 B2
(45) Date of Patent: Mar. 12, 2024

(54) METHODS FOR EVALUATING DIESEL EXHAUST FLUID QUALITY

(71) Applicant: PACCAR Inc, Bellevue, WA (US)

(72) Inventors: Charles Wayne Reinhardt Swart, Bellingham, WA (US); Cynthia Chaffin Webb, Sedro-Woolley, WA (US); Maarten Meijer, Anacortes, WA (US); Varun Ramesh, Bellingham, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 17/965,540

(22) Filed: Oct. 13, 2022

(65) Prior Publication Data

US 2023/0034184 A1 Feb. 2, 2023

Related U.S. Application Data

(62) Division of application No. 17/002,515, filed on Aug. 25, 2020, now Pat. No. 11,499,463.

(Continued)

(51) Int. Cl.
*F01N 3/20* (2006.01)
*B01D 53/94* (2006.01)
(Continued)

(52) U.S. Cl.
CPC ......... *F01N 3/208* (2013.01); *B01D 53/9418* (2013.01); *B01D 53/9495* (2013.01); *F01N 11/00* (2013.01); *F01N 13/009* (2014.06); *F01N 13/0093* (2014.06); *F01N 2550/03* (2013.01); *F01N 2550/05* (2013.01);
(Continued)

(58) Field of Classification Search
CPC ........ F01N 3/208; F01N 11/00; F01N 13/009; F01N 13/0093; F01N 2550/03; F01N 2550/05; F01N 2610/02; F01N 2610/1406; F01N 2900/16; F01N 2900/1621; F01N 2900/1806; F01N 2900/1814; F01N 2900/1818; F01N 2550/02; F01N 3/2066; B01D 53/9418; B01D 53/9495; Y02T 10/12; Y02T 10/40
See application file for complete search history.

(56) References Cited

U.S. PATENT DOCUMENTS 8,778,290 B1 7/2014 Ren et al.
10,690,033 B1 6/2020 Johnson et al.
(Continued)

FOREIGN PATENT DOCUMENTS

CN 106246301 B 7/2019
DE 10 2010 034707 A1 2/2012
(Continued)

*Primary Examiner* — Brandon D Lee
(74) *Attorney, Agent, or Firm* — Seed IP Law Group LLP

(57) ABSTRACT

The present disclosure describes methods for evaluating quality of DEF dosed to an EAS including a close coupled SCR unit a downstream SCR unit. A NOx conversion efficiency of the close coupled SCR unit and a NOx conversion efficiency of the downstream SCR unit are used to evaluate quality of DEF. In some embodiments, the NOx conversion efficiency of close coupled SCR unit is used to evaluate quality of DEF. Operation of an EAS using the results of the evaluation of quality of DEF are described.

15 Claims, 10 Drawing Sheets

Related U.S. Application Data

(60) Provisional application No. 63/058,986, filed on Jul. 30, 2020, provisional application No. 63/056,131, filed on Jul. 24, 2020, provisional application No. 63/054,468, filed on Jul. 21, 2020.

(51) Int. Cl.
*F01N 11/00* (2006.01)
*F01N 13/00* (2010.01)

(52) U.S. Cl.
CPC .. *F01N 2610/02* (2013.01); *F01N 2610/1406* (2013.01); *F01N 2900/16* (2013.01); *F01N 2900/1621* (2013.01); *F01N 2900/1806* (2013.01); *F01N 2900/1814* (2013.01); *F01N 2900/1818* (2013.01)

(56) References Cited

U.S. PATENT DOCUMENTS

| | | |
|---|---|---|
| 10,753,255 B2 | 8/2020 | Schweizer |
| 10,760,513 B1 | 9/2020 | Huhn et al. |
| 10,920,641 B2 | 2/2021 | Kinnaird et al. |
| 11,035,274 B2 | 6/2021 | Johansson et al. |
| 11,181,026 B1 | 11/2021 | Webb et al. |
| 2004/0128983 A1 | 7/2004 | Okada et al. |
| 2006/0153761 A1 | 7/2006 | Bandl-Konrad et al. |
| 2007/0079605 A1 | 4/2007 | Hu et al. |
| 2007/0082783 A1 | 4/2007 | Hu et al. |
| 2007/0122317 A1 | 5/2007 | Driscoll et al. |
| 2007/0193253 A1 | 8/2007 | Tsumagari |
| 2008/0072575 A1 | 3/2008 | Yan |
| 2008/0295493 A1 | 12/2008 | Applegate et al. |
| 2009/0035194 A1 | 2/2009 | Robel et al. |
| 2009/0158706 A1* | 6/2009 | Sun ............... F01N 3/0231 60/274 |
| 2009/0183501 A1 | 7/2009 | Gonze et al. |
| 2010/0242440 A1 | 9/2010 | Garimella et al. |
| 2011/0000194 A1 | 1/2011 | Gonze et al. |
| 2011/0047964 A1 | 3/2011 | Yezerets et al. |
| 2011/0061372 A1 | 3/2011 | Levijoki et al. |
| 2011/0265452 A1 | 11/2011 | Geveci et al. |
| 2011/0271660 A1 | 11/2011 | Gonze et al. |
| 2012/0085082 A1* | 4/2012 | Levijoki ............ F01N 11/00 60/287 |
| 2013/0232958 A1 | 9/2013 | Ancimer et al. |
| 2013/0311065 A1 | 11/2013 | Sun et al. |
| 2014/0033683 A1* | 2/2014 | Wei ............... F01N 11/00 60/274 |
| 2014/0363358 A1 | 12/2014 | Udd et al. |
| 2015/0023853 A1* | 1/2015 | Wittrock ........... F01N 3/0231 422/171 |
| 2015/0040540 A1 | 2/2015 | Hulser et al. |
| 2015/0040543 A1 | 2/2015 | Shetney et al. |
| 2015/0096287 A1* | 4/2015 | Qi ............... F01N 3/208 60/286 |
| 2015/0151251 A1* | 6/2015 | Gaudin ............ F01N 3/208 423/212 |
| 2015/0247435 A1 | 9/2015 | Garimella et al. |
| 2015/0275730 A1* | 10/2015 | Gupta ............ B01D 53/9486 60/276 |
| 2015/0276694 A1 | 10/2015 | Lahr |
| 2015/0314239 A1 | 11/2015 | Kawaguchi et al. |
| 2015/0337702 A1 | 11/2015 | Ettireddy et al. |
| 2016/0032803 A1 | 2/2016 | Ettireddy et al. |
| 2016/0186629 A1 | 6/2016 | Osburn et al. |
| 2016/0186630 A1 | 6/2016 | Osburn et al. |
| 2016/0346732 A1 | 12/2016 | Schmitt et al. |
| 2017/0051654 A1 | 2/2017 | Gupta et al. |
| 2017/0114690 A1 | 4/2017 | Gupta et al. |
| 2017/0122159 A1 | 5/2017 | Bahrami |
| 2017/0130629 A1 | 5/2017 | Nagel et al. |
| 2017/0175604 A1 | 6/2017 | Devarakonda et al. |
| 2017/0234199 A1 | 8/2017 | Sun et al. |
| 2017/0306819 A1 | 10/2017 | Alfieri et al. |
| 2018/0080359 A1 | 3/2018 | Price et al. |
| 2018/0087426 A1 | 3/2018 | Dou et al. |
| 2018/0163589 A1 | 6/2018 | David et al. |
| 2018/0230879 A1 | 8/2018 | Saitoh et al. |
| 2018/0252136 A1 | 9/2018 | Concetto Pesce et al. |
| 2018/0274420 A1 | 9/2018 | Kleinknecht et al. |
| 2018/0274421 A1 | 9/2018 | Smith et al. |
| 2018/0334939 A1 | 11/2018 | Mital et al. |
| 2018/0345217 A1 | 12/2018 | Goffe |
| 2018/0345218 A1 | 12/2018 | Goffe |
| 2019/0078481 A1 | 3/2019 | Schweizer |
| 2019/0155230 A1 | 5/2019 | Culbertson et al. |
| 2019/0345861 A1 | 11/2019 | Johansson et al. |
| 2019/0360415 A1 | 11/2019 | Romanato |
| 2019/0383189 A1 | 12/2019 | Dou et al. |
| 2020/0063634 A1* | 2/2020 | Smith ............... F01N 3/208 |
| 2020/0316571 A1 | 10/2020 | Goffe |
| 2020/0332691 A1 | 10/2020 | Soeger et al. |
| 2021/0079826 A1 | 3/2021 | Voss et al. |
| 2021/0095590 A1 | 4/2021 | Bastoreala et al. |
| 2022/0010713 A1 | 1/2022 | McCarthy, Jr. et al. |

FOREIGN PATENT DOCUMENTS

| | | |
|---|---|---|
| DE | 102018101929 A1 | 8/2019 |
| DE | 10 2018 205132 A1 | 10/2019 |
| EP | 3009622 A1 | 4/2016 |
| EP | 3581773 A1 | 12/2019 |
| WO | WO 2009031030 A2 | 3/2009 |
| WO | WO 2009123633 A1 | 10/2009 |
| WO | WO 2014032686 A1 | 3/2014 |

* cited by examiner

DEF quality = Nominal DEF * (ANR$_{nominal}$-ANR$_{measured\_peak}$)

METHODS FOR EVALUATING DIESEL EXHAUST FLUID QUALITY

BACKGROUND

Technical Field

The present disclosure generally relates to engine emissions management, and more particularly, to engine NOx emissions management.

Description of the Related Art

Although diesel engines are known to be more economical to run than spark-ignited engines, diesel engines inherently face challenges in the area of emissions. For example, a diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), nitrogen oxides ("$NO_x$"), and sulfur oxides ("$SO_x$"). Engine exhaust aftertreatment system can be utilized to reduce or eliminate emissions of these and other combustion products.

An approach to reduce or eliminate NOx emissions is to include an additional close-coupled SCR and diesel exhaust fluid (DEF) dosing system as close to the engine as possible to take full advantage of the available thermal energy of the engine exhaust gas. The conversion efficiency of an SCR catalyst can be affected by a number of factors including aging of the catalyst, out of specification DEF, DEF injector failure, DEF pump failure and DEF line blockages. Out of specification DEF can result from either poor quality DEF supplied by a vendor or as a result of standard quality DEF being diluted with another liquid, such as water.

BRIEF SUMMARY

A method may be summarized as comprising: evaluating diesel exhaust fluid (DEF) quality in an engine emissions aftertreatment system (EAS) for an internal combustion engine including a close coupled selective catalytic reduction (SCR) unit and a downstream (or underbody) SCR unit. The method includes determining a NOx conversion efficiency of the close coupled SCR unit and comparing the determined NOx conversion efficiency of the close coupled SCR unit to a target NOx conversion efficiency for the close coupled SCR unit. A NOx conversion efficiency of the downstream SCR unit is determined and compared to a target NOx conversion efficiency for the downstream SCR unit. The results of the comparison are used to evaluate quality of DEF provided to the EAS.

The determining NOx conversion efficiency of the close coupled SCR unit or the downstream SCR unit is initiated after an amount of DEF in a DEF tank of the EAS has changed more than 20%.

A method may be summarized as comprising, evaluating diesel exhaust fluid (DEF) quality in an engine emissions aftertreatment system (EAS) for an internal combustion engine including a close coupled selective catalytic reduction (SCR) unit and a downstream (or underbody) SCR unit. The method includes during steady-state operation of the EAS, varying an ammonia to NOx ratio of an internal combustion engine exhaust gas entering the close coupled SCR unit. NOx conversion efficiency of the close coupled SCR unit at a plurality of different ammonia to NOx ratios of the internal combustion engine exhaust gas is determined. The determined NOx conversion efficiency of the close coupled SCR unit is used to evaluate quality of DEF provided to the EAS. When the ammonia to NOx ratio of the internal combustion engine exhaust gas entering the close coupled SCR unit is varied during the steady state operation of the EAS, NOx content of the internal combustion engine exhaust gas is reduced in the downstream SCR unit. In some embodiments, the downstream SCR unit reduces the NOx content of the internal combustion engine exhaust gas entering the close coupled SCR unit by 95% or more.

A method may be summarized as comprising, evaluating diesel exhaust fluid (DEF) quality in an engine emissions aftertreatment system (EAS) for an internal combustion engine including a close coupled selective catalytic reduction (SCR) unit and a downstream (or underbody) SCR unit. The method includes determining a NOx conversion efficiency of the close coupled SCR unit and comparing the determined NOx conversion efficiency of the close coupled SCR unit to a target NOx conversion efficiency for the close coupled SCR unit. A NOx conversion efficiency of the downstream SCR unit is determined and compared to a target NOx conversion efficiency for the downstream SCR unit. A result of the comparison is used to evaluate quality of DEF provided to the EAS. A result of the evaluation of quality of DEF provided to the EAS is used to adjust an operation parameter of the EAS.

A method may be summarized as comprising, evaluating diesel exhaust fluid (DEF) quality in an engine emissions aftertreatment system (EAS) for an internal combustion engine including a close coupled selective catalytic reduction (SCR) unit and a downstream (or underbody) SCR unit. The method includes, during steady-state operation of the EAS, varying an ammonia to NOx ratio of an internal combustion engine exhaust gas entering the closed SCR unit. The NOx conversion efficiency of the close coupled SCR unit at a plurality of different ammonia to NOx ratios of the internal combustion engine exhaust gas is determined. The determined NOx conversion efficiency of the close coupled SCR unit is used to evaluate quality of DEF provided to the EAS. The result of the evaluating quality of DEF provided to the EAS is used to adjust an operation parameter of the EAS. When the ammonia to NOx ratio of the internal combustion engine exhaust gas entering the close coupled SCR unit is varied during the steady state operation of the EAS, NOx content of the internal combustion engine exhaust is reduced in the downstream SCR unit.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1A:
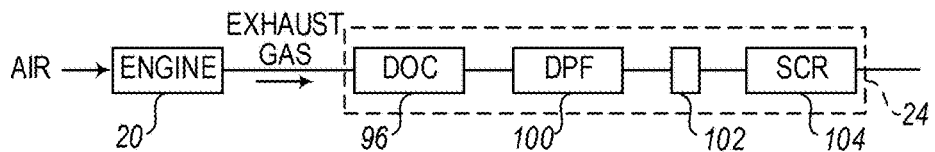
FIG. 1A is a schematic block diagram of an example of an emission aftertreatment system coupled to an internal combustion engine.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

FIG. 1A shows a block diagram providing a brief overview of a vehicle powertrain. The components include an internal combustion engine 20 in flow communication with one or more selected components of an emission aftertreatment system 24 (EAS). The illustrated emission aftertreatment system 24 includes an oxidation system 96 upstream of a particulate filter 100. In the embodiment shown, the oxidation system 96 is a diesel oxidation catalyst (DOC) 96 coupled in flow communication to receive and treat exhaust from the engine 20. The DOC 96 is preferably a flow-through device that includes either a honeycomb-like or plate-like substrate. The DOC substrate has a surface area that includes (e.g., is coated with) a catalyst. The catalyst can be an oxidation catalyst, which can include a precious metal catalyst, such as platinum or palladium, for rapid conversion of hydrocarbons, carbon monoxide, and nitric oxides in the engine exhaust gas into carbon dioxide, nitrogen, water, or $NO_2$.

Once the exhaust as flows through DOC 96 it flows into the particulate filter 100, which in the illustrated embodiment is a diesel particulate filter (DPF) 100. The DPF 100 is utilized to capture unwanted diesel particulate matter from the flow of exhaust gas exiting engine 20, by flowing exhaust across the walls of channels within DFP 100. The diesel particulate matter includes sub-micron sized solid and liquid particles found in exhaust of a diesel fueled internal combustion engine. The DPF 100 can be manufactured from a variety of materials including but not limited to cordierite, silicon carbide, and/or other high temperature oxide ceramics.

From DPF 100, treated exhaust gases proceed through a compartment in fluid communication with a diesel exhaust fluid (DEF) doser 102 for the introduction of a reductant, such as ammonia or a urea solution into the exhaust gases. The exhaust gases and reductant then flow to a selective catalytic reduction (SCR) system or unit 104 which includes a catalytic core having a selective catalytic reduction catalyst (SCR catalyst) loaded thereon. System 24 can include one or more sensors (not illustrated in FIG. 1A) associated with components of the system 24, such as one or more temperature sensors, $NO_X$ sensors, $NH_3$ sensors, oxygen sensors, mass flow sensors, volumetric flow sensors, particulate sensors, and a pressure sensors.

As discussed above, the emission aftertreatment system 24 includes a Selective Catalytic Reduction (SCR) system 104. The SCR system 104 includes a selective catalytic reduction catalyst which interacts with $NO_X$ gases to convert the $NO_X$ gases into $N_2$ and water, in the presence of an ammonia reductant. The overall reactions of $NO_X$ reductions in SCR are shown below.

$$4NO+4NH_3+O_2 \rightarrow 4N_2+6H_2O \quad (1)$$

$$6NO_2+8NH_3 \rightarrow 7N_2+12H_2O \quad (2)$$

$$2NH_3+NO+NO_2 \rightarrow 2N_2+3H_2O \quad (3)$$

Where Equation (1) represents a standard SCR reaction and Equation (3) represents a fast SCR reaction.

Figure 1B:
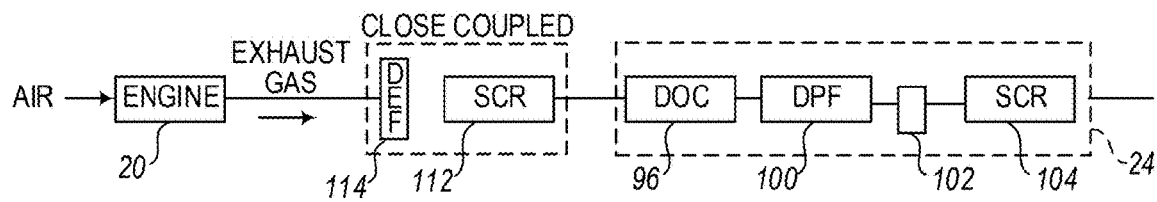
FIG. 1B is a schematic block diagram of an example of an emission aftertreatment system with a close coupled selective catalytic reduction unit coupled to an internal combustion engine.

Referring to FIG. 1B, some EAS include a "close-coupled SCR" or "upstream SCR" 112 associated with a DEF doser 114 located upstream of the close-coupled SCR 112. The close-coupled SCR 112 is located closer to the engine 20 than the downstream SCR 104 (sometimes referred to as an under-body SCR) and in some embodiments as close to the engine as possible. An example of a close-coupled SCR 104 configuration is illustrated in FIG. 1B. Such close-coupled SCR configuration employs dual DEF dosers 102 and 114 (one upstream of the close-coupled SCR 112 and one upstream of the downstream SCR 104 and below the close-coupled SCR 112.

Figure 1C:
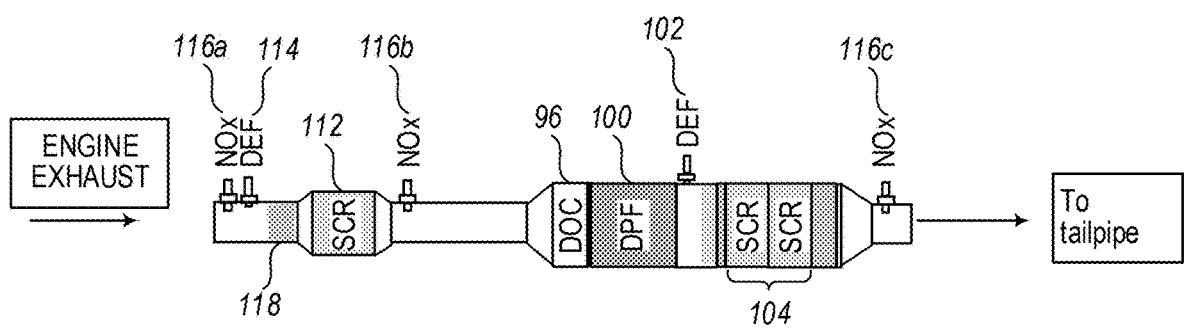
FIG. 1C is a schematic diagram of an example of an emission aftertreatment system with a close coupled selective catalytic reduction unit coupled to an internal combustion engine including a plurality of sensors, according to one non-limiting illustrated embodiment.

FIG. 1C illustrates an example of the EAS described above with reference to FIG. 1B. In FIG. 1C, the same reference numbers as used in FIG. 1B are used to identify identical features illustrated in FIG. 1C. For example, EAS illustrated in FIG. 1C includes first DEF doser 114, upstream SCR unit 112, diesel oxidation catalyst unit 96, diesel particulate filter 100, second DEF doser 102 and downstream SCR unit 104. In the embodiment illustrated in FIG. 1C, downstream SCR 104 is illustrated as included two bricks of substrates supporting SCR catalyst(s). EAS illustrated in FIG. 1C further includes a plurality of NOx sensors 116. A NOx sensor 116a is located upstream of DEF doser 114. NOx sensor 116b is located downstream of upstream SCR 112 which is upstream of downstream SCR 104. NOx sensor 116c is positioned downstream of downstream SCR 104. Such NOx sensors are designed to detect concentrations of NOx in the exhaust gas; however, such NOx sensors used in EAS are often unable to differentiate between NOx in the exhaust gas and ammonia in the exhaust gas. Accordingly, signals generated by the NOx sensors are an indication of the concentration or amount of NOx and ammonia in the exhaust gas the sensor is interrogating. In the embodiment illustrated in FIG. 1C, the EAS includes a thermal input device 118, e.g., an electric heater downstream of DEF doser 114 and upstream of SCR 112. This thermal input device is used, to introduce thermal energy into the exhaust gas, thereby increasing the temperature of the exhaust gas flowing into the close coupled SCR unit 112. The temperature of the exhaust gas flowing into the close coupled SCR unit 112 can also be adjusted through the implementation of an exhaust gas recirculation system which recirculates a portion of the exhaust gas to the internal combustion engine. Adjusting the temperature of the exhaust gas flow into the close coupled SCR unit 112 is one way to adjust the temperature of the catalyst in the SCR unit 112. While the embodiment of an EAS illustrated in FIG. 1C includes two SCR units 112 and 104, embodiments of the present disclosure include an EAS that includes more than two SCR units and methods in accordance with embodiments of the present disclosure can be practiced in an EAS that includes two or more SCR units.

In accordance with an embodiment of the present disclosure, NOx conversion efficiency of a close coupled SCR unit in an EAS that includes the close coupled SCR unit and a downstream (or underbody) SCR unit are evaluated, i.e., while the internal combustion engine and EAS operably connected to the internal combustion engine is operating. In some embodiments, the NOx conversion efficiency of the close coupled SCR unit is evaluated intrusively, e.g., while the internal combustion engine is generating exhaust gas and the EAS is in operation. In NOx conversion efficiency represents the ability of catalyst in an SCR unit to convert NOx into desired reaction products, such as water and nitrogen gas. NOx conversion efficiency is determined by subtracting the amount of NOx in exhaust gas exiting the close coupled SCR unit from the amount of NOx entering the close coupled SCR unit and dividing the difference by the amount of NOx entering the close coupled SCR unit. In accordance with some embodiments described herein, NOx conversion efficiency of a close coupled SCR unit is evaluated at a plurality of different temperatures of the close coupled SCR unit or the downstream SCR unit, while the EAS is operating under otherwise substantially steady-state conditions. In accordance with other embodiments, the NOx conversion efficiency of the close coupled SCR unit is evaluated at a plurality of different ammonia to NOx ratios (ANR) at which the close coupled SCR unit is operated during otherwise substantially steady state EAS operating conditions. In accordance with embodiments of the present disclosure, the resulting NOx conversion efficiency values at the plurality ANR values or the plurality of different temperatures are used to evaluate DEF quality. In accordance with other embodiments of the present disclosure, the results of the evaluation of DEF quality are used to operate the EAS including the close coupled SCR unit, (e.g., adjusting operation parameters of the EAS).

Figure 2:
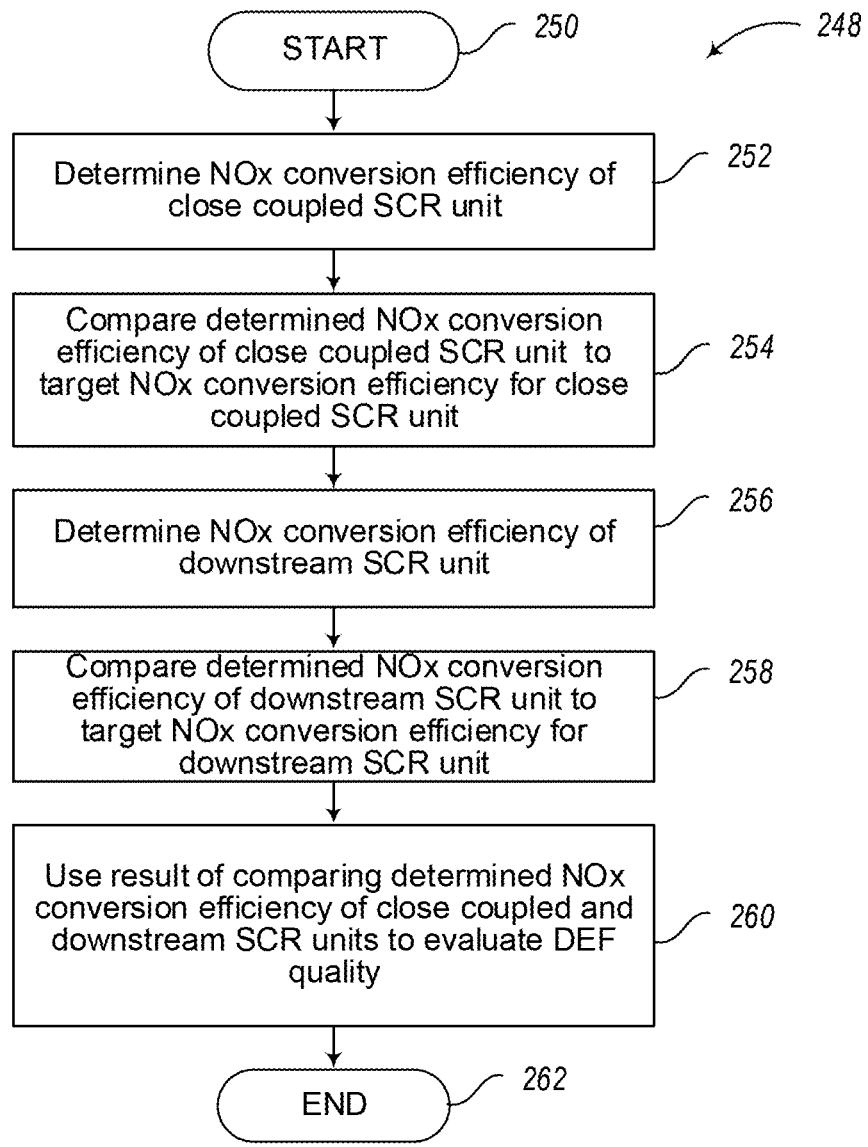
FIG. 2 is a flow diagram of a method of evaluating DEF quality according to one non-limiting illustrated embodiment.

Referring to FIGS. 2, 1B and 1C, in accordance with an embodiment of the present disclosure, a method 248 of evaluating quality of DEF dosed to an emission after treatment system (EAS) including a close coupled selective catalytic reduction (SCR) unit 112 and a downstream (e.g., underbody) SCR unit 104 starts at step 250. In accordance with method 248, at step 252 the NOx conversion efficiency of the close coupled SCR unit 112 is determined, e.g., in accordance with the method of determining NOx conversion efficiency described above. At step 254, the determined NOx conversion efficiency of the close coupled SCR unit 114 is compared to a target or known NOx conversion efficiency for the close coupled SCR unit 112. A method for generating the target or known NOx conversion efficiency for the close coupled SCR unit 112 is described below. Method 248 proceeds with step 256 of determining NOx conversion efficiency of the downstream SCR unit 104, e.g., in accordance with the method of determining NOx conversion efficiency described above. In step 258, the determined NOx conversion efficiency of the downstream SCR unit 104 is compared to a known or target NOx conversion efficiency for the downstream SCR unit 104. A method for generating the target or known NOx conversion efficiency for the close coupled SCR unit 112 is described below. In accordance with this embodiment, the results of comparing the determined NOx conversion efficiency of the close coupled SCR unit 112 and the NOx conversion efficiency of the downstream SCR unit 104 to their known NOx conversion efficiencies are used to evaluate quality of DEF as described below in more detail. The method illustrated in FIG. 2, ends at step 260.

In accordance with this embodiment, the NOx conversion efficiency of the close coupled SCR unit 112 and the NOx conversion efficiency of the downstream SCR unit 104 are determined at a plurality of different temperatures, e.g., different temperatures of the catalyst bed in the respective SCR unit. Embodiments in accordance with the present disclosure are not limited to determining NOx conversion efficiency of the close coupled SCR unit 112 and NOx conversion efficiency of the downstream SCR 104 at a plurality of different temperatures. In some embodiments, NOx conversion efficiency for the close coupled SCR 112 and NOx conversion efficiency of the downstream SCR 104 at a single temperature are determined and used to evaluate quality of DEF dosed to the EAS in accordance with embodiments of the present disclosure.

As discussed above, in some embodiments of the present disclosure, the EAS includes a thermal input device (118 in FIG. 1C), e.g., an electric heater downstream of DEF doser 114 and upstream of close coupled SCR 112. This thermal input device is used, to introduce thermal energy into the exhaust gas, thereby increasing the temperature of the exhaust gas flowing into the close coupled SCR unit 112 and into the downstream SCR 104. This input a thermal energy into the exhaust gas causes the temperature of the exhaust gas to change which supports the determination of the NOx conversion efficiency of the close coupled SCR 112 and the NOx conversion efficiency of the downstream SCR 104 at a plurality of different temperatures. The temperature of the exhaust gas flowing into the close coupled SCR 112 and the downstream SCR 104 can also be adjusted through the implementation of an exhaust gas recirculation system which recirculates a portion of the exhaust gas to the internal combustion engine.

In this embodiment, the EAS is operated at one or more steady state conditions. Steady-state conditions of the EAS include one or more of a substantially constant volumetric flow of exhaust gas through the close coupled SCR 112, a substantially constant volumetric flow of exhaust gas through the downstream SCR 104, substantially constant amount of DEF dosing and a substantially constant NOx content of the exhaust gas flowing to the close coupled SCR unit 112. Embodiments in accordance with the present disclosure are not limited to the foregoing described steady-state conditions of the EAS. Embodiments in accordance with the present disclosure include those that evaluate quality of DEF dosed to an EAS at one or more steady-state conditions other than those expressly described above. In some embodiments, the reference to a plurality of temperatures at which the NOx conversion efficiency of the close coupled SCR 112 and the downstream SCR 104 refers to a temperature of a catalyst bed within the respective SCR units. In some embodiments, the temperature of a catalyst bed within the close coupled SCR unit 112 in the downstream SCR 104 is a mid-bed temperature of the catalyst within the respective SCR unit. In some embodiments, a mid-bed temperature is determined by averaging the temperature of the exhaust gas into the SCR unit and the temperature of the exhaust gas exiting the SCR unit. Embodiments in accordance with the present disclosure are not limited to determining NOx conversion efficiency of the close coupled SCR unit 112 and the downstream SCR unit 104 at a plurality of mid-bed temperatures. In other embodiments in accordance with the present disclosure, NOx conversion efficiency of an SCR unit is determined at a plurality of temperatures other than a plurality mid-bed temperatures. For example, in some embodiments, NOx conversion efficiency of a SCR unit is determined at a plurality of temperatures of the exhaust gas entering the SCR unit or at a plurality of temperatures of the exhaust gas exiting the SCR unit.

As used herein with reference to the internal combustion engine 20, steady-state conditions, refers to: one or more of substantially constant RPM, substantially constant load, substantially constant exhaust gas temperature, substantially constant volumetric flow of exhaust gas and substantially constant NOx concentration. The internal combustion engine steady-state conditions and the EAS steady-state conditions are not limited to those recited above and can include other operating conditions of the EAS and the internal combustion engine that are held steady during NOx conversion efficiency of the SCR unit 112 and SCR 104 determinations in accordance with embodiments of the present disclosure. The term "substantially constant" as used herein, refers to a variance of less than 15% above or below the average value of the variable during the period in question. For example, an exhaust gas temperature would be "substantially constant" when the exhaust gas temperature is between 85% and 115% of the average temperature of the exhaust gas at the measurement point (e.g., exiting the internal combustion engine or entering a SCR unit) during the period in question. The term "constant" as used herein, refers to the variable in question being within 5% of the average value of the variable during the period in question. For example, an exhaust gas temperature would be "constant" when the exhaust gas temperature is between 95% and 105% of the average temperature of the exhaust gas (e.g., exiting the internal combustion engine or entering a SCR unit) during the period in question.

In accordance with this embodiment of the present disclosure, the target or known NOx conversion efficiency for the close coupled SCR 112 and the downstream SCR 104 of step 254 and step 258 are determined as described below. In the following description of determining a target or known NOx conversion efficiency, the close coupled SCR 112 and the downstream SCR 104 are collectively referred to as "an SCR unit" or "the SCR unit". In accordance with some embodiments of the present disclosure, the known NOx conversion efficiency at the plurality of different temperatures is previously determined using an SCR catalyst unit including the same volume and type of catalyst as used in the close coupled or downstream SCR unit under evaluation and which was operated at an ANR substantially equal to the ANR at which the close coupled SCR unit under evaluation was controlled to operate when the NOx conversion efficiency of the close coupled SCR unit was determined. In addition, in some embodiments, the catalyst of the SCR unit from which the target NOx conversion efficiency is generated has been aged to approximate the age of the catalyst in the SCR unit under evaluation. Such aging of the catalyst can be achieved by exposing the catalyst to elevated temperatures for extended periods of time. In one embodiment, the known NOx conversion efficiency of a SCR unit including the same volume and type of catalyst as the SCR unit under evaluation is determined on a bench testing unit. Embodiments in accordance with the present disclosure are not limited to determining the known NOx conversion efficiency on a bench testing unit. For example, in some embodiments, the known NOx conversion efficiency is determined by means other than a bench testing unit, e.g., from monitoring the NOx conversion efficiency at a plurality of temperatures of an SCR unit in a real world installation, e.g., on a vehicle.

In accordance with this embodiment of the present disclosure, the known NOx conversion efficiencies at a plurality of temperatures for the close coupled SCR unit 112 and the downstream SCR 104 are stored in one or more lookup tables as a function of age of the catalyst present in the respective SCR unit. The age variable in the lookup table can be hours of operation of SCR unit, volume of exhaust gas treated by the SCR, hours an internal combustion engine connected to the SCR unit was operated at an RPM above idling RPMs or some other measure of catalyst age.

Figure 3A:
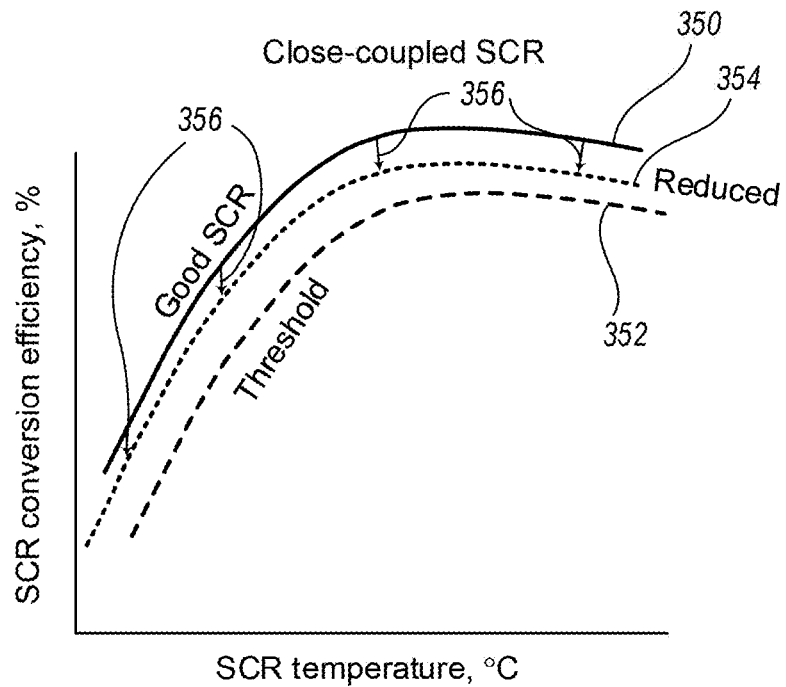
FIGS. 3A and 3B are plots of SCR conversion efficiency as a function of SCR temperature for a close coupled SCR and in underbody SCR according to one non-limiting illustrated embodiment.

An example of a known NOx conversion efficiency for close coupled SCR 112 is illustrated in FIG. 3A as the plot 350 of "Good SCR". FIG. 3A also reflects a "Threshold" plot of NOx conversion efficiency for close coupled SCR 112 versus temperature (broken line), which reflects a predetermined % variance from the known (or target) NOx conversion efficiency curve 350 at a plurality of temperatures. Examples of the predetermined % variance can range from about 0.5 to 10%; however, embodiments in accordance with the present disclosure are not limited to this range of predetermined percent variance. Embodiments in accordance with the present invention can utilize a predetermined percent variance that is less than 0.5% or greater than 10%. The results of the determination of the NOx conversion efficiency for close coupled SCR 112 at a plurality of temperatures in accordance with step 252 are illustrated by plot 354. Plot 354 illustrates that the NOx conversion efficiency of close coupled SCR 112 falls below the target NOx conversion efficiency plot 350 by the margins identified by arrows 356.

Figure 3B:
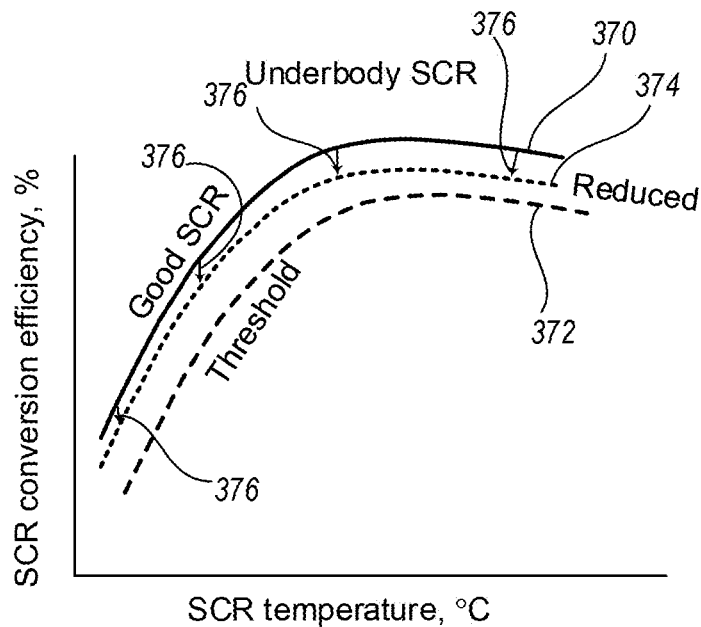

An example of a known NOx conversion efficiency for a downstream SCR 104 at a plurality of temperatures is illustrated in FIG. 3B as the plot 370 of "Good SCR". FIG. 3B also reflects a "Threshold" plot 372 of NOx conversion efficiency for downstream SCR 104 versus temperature (broken line), which reflects a predetermined % variance from the target NOx conversion efficiency curve at a plurality of temperatures. Examples of the predetermined % variance can range from about 0.5 to 10%; however, embodiments in accordance with the present disclosure are not limited to this range of predetermined percent variance. Embodiments in accordance with the present invention can utilize a predetermined percent variance that is less than 0.5% or greater than 10%. The results of the determination of the NOx conversion efficiency for downstream SCR 104 at a plurality of temperatures in accordance with step 256 are illustrated by plot 374. Plot 374 illustrates that the NOx conversion efficiency of downstream SCR 104 falls below the target NOx conversion efficiency plot 370 by the margins identified by arrows 376.

In accordance with the embodiment of FIG. 2, the NOx conversion efficiency of close coupled SCR 112 at a plurality of temperatures and the NOx conversion efficiency of downstream SCR 104 at a plurality of temperatures (plots 354 and 374) are compared to their respective target NOx conversion efficiencies at similar temperatures (plots 350 and 370 in FIGS. 3A and 3B) at step 254 and 258, respectively. In accordance with some disclosed embodiments, the results of such comparison are used to evaluate quality of DEF dosing to the EAS at step 260. In accordance with some embodiments, when the actual NOx conversion efficiency of the close coupled SCR 112 and the actual NOx conversion efficiency of the downstream SCR 104 fall below the target NOx conversion efficiency (plots 350 and 370) by an amount that is substantially equal (as shown in FIGS. 3A and 3B), method 248 determines that a component or parameter common to both the close coupled SCR 112 and downstream SCR 104 is may be operating ineffectively and may be a cause of the decreased NOx conversion efficiency for both SCR units. One example of such a parameter common to both the close coupled SCR 112 and downstream SCR 104 is quality of DEF which is delivered to both SCR units from a single source of DEF. Other examples of a component or parameter common to both close coupled SCR 112 and downstream SCR 104 include a pump or lines used to flow DEF from a common DEF source to both SCR units. In accordance with some embodiments, when the actual NOx conversion efficiency of the close coupled SCR 112 and the actual NOx conversion efficiency of the downstream SCR 104 fall below their respective target NOx conversion efficiency by an amount that is substantially equal, method 248 determines a change in DEF quality (e.g., reduction in concentration of reductant such as urea or ammonia in the DEF) or malfunction of a common DEF delivery component is possibly a factor contributing to the reduced NOx conversion efficiency of the close coupled SCR 112 and the downstream SCR 104. In an EAS where both close coupled SCR 112 and downstream SCR 104 receive DEF from the same source, a substantially equal decrease in actual NOx conversion efficiency for the close coupled SCR 112 and the downstream SCR 104 is interpreted to indicate that DEF components or parameters that are common to both SCR units (e.g., concentration of reductant in DEF or DEF delivery components common to both SCR units) are potential causes of the reduction in NOx conversion efficiency of both SCR units and that a component or parameter that is not common to both SCR units is unlikely to be contributing to the reduction in NOx conversion efficiency of both units.

In accordance with some embodiments of the present disclosure, method 248 further includes a step (not shown in FIG. 2) of generating an indication (diagnostic signal) that quality of DEF (or operation of a DEF delivery component or parameter common to both SCR units) may be compromised. Under such circumstances, a diagnostic signal may be generated by control system (110 in FIG. 10). In accordance with some embodiments of the present disclosure, determination of whether a diagnostic signal will be generated is based on a determination whether a reduction in the NOx conversion efficiency of the upstream SCR 112 is substantially equal to the reduction in the NOx conversion efficiency of the downstream SCR 104. Utilizing a plurality of NOx conversion efficiencies at a plurality of different temperatures for purposes of evaluating DEF quality or operation of components or parameters associated with DEF dosing for both close coupled SCR 112 and downstream SCR 104 provides a more robust diagnostic of the DEF quality or operation of components or parameters associated with DEF dosing for both close coupled SCR 112 and downstream SCR 104 compared to basing diagnosis at a specific single temperature.

In some embodiments, when method 248 determines the quality of DEF dosed to the EAS is compromised (i.e., diluted), corrective actions are taken, e.g., increasing the dosing of the DEF so as to increase the NOx conversion efficiency of the close coupled SCR 112. Such corrective actions may be continued until such time that a preset upper limit on the value of the corrective action is reached, at which time in accordance with some embodiments of the present disclosure, a signal is generated indicating a potential malfunction of the EAS. Alternatively, the signal indicating a potential malfunction of the EAS is issued after the method determines DEF quality may have been compromised and before corrective action is taken.

As used in the foregoing paragraph, the phrase "substantially equal" is not limited to a specific difference between the amount plots 350 and 354 differ from each other and the amount plots 370 and 374 differ from each other at a particular temperature. Examples of substantially equal include a difference between the amount plots 350 and 354 differ from each other and the amount plots 370 and 374 differ from each other at a particular temperature or plurality of temperatures that is less than 2.5%, less than 5%, less than 7.5%, less than 10%, less than 12.5%, less than 15%, less than 17.5% or less than 20%. Embodiments in accordance with the present disclosure are not limited to differences between the amount plots 350 and 354 differ from each other and the amount plots 370 and 374 differ from each other at a particular temperature that is less than 20% to be substantially equal, for example, in other embodiments the difference between the amount plots 350 and 354 differ from each other and the amount plots 370 and 374 differ from each other at a particular temperature is substantially equal when the difference is more than 20%.

Figure 4A:
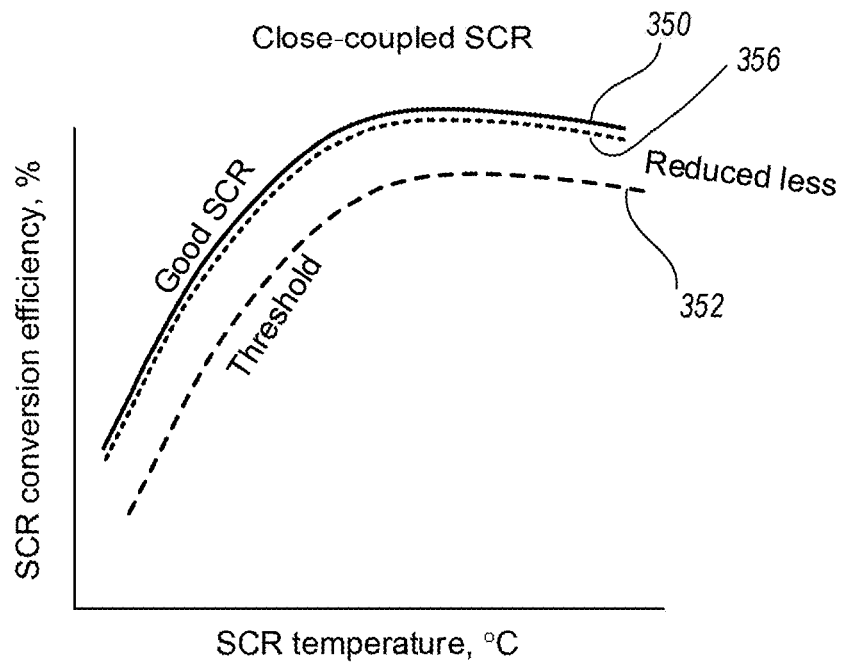
FIGS. 4A and 4B are plots of SCR conversion efficiency as a function of SCR temperature for a close coupled SCR and in underbody SCR according to one non-limiting illustrated embodiment.
Figure 4B:
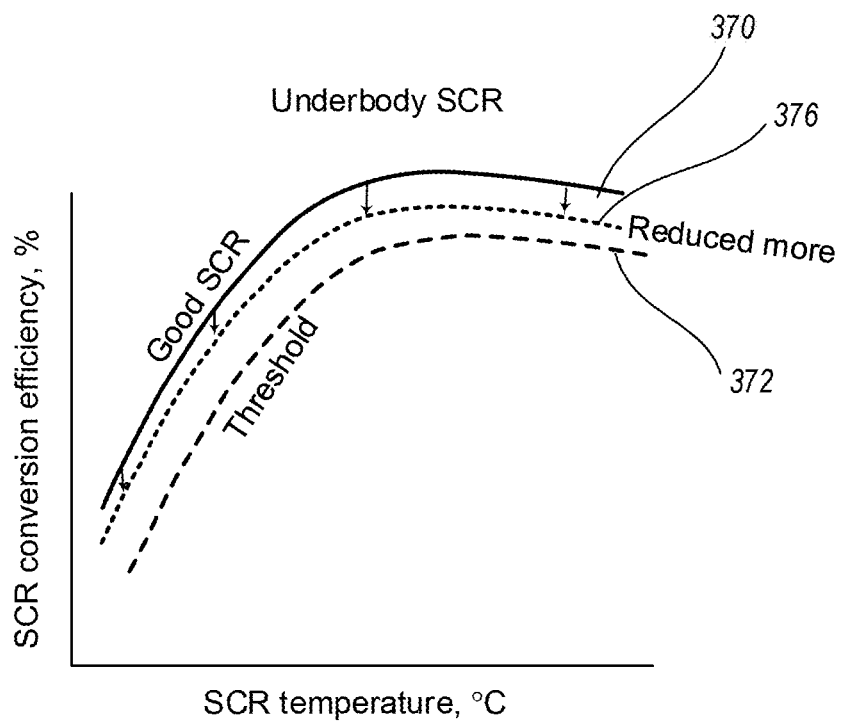

FIGS. 4A and 4B include plots 350, 352, 370 and 372 that are identical to plots 350, 352, 370 and 372 in FIGS. 3A and 3B. In FIGS. 4A and 4B, different results of a determination of the NOx conversion efficiency for close coupled SCR 112 at step 252 are illustrated by plot 356. Plot 356 illustrates that the NOx conversion efficiency of close coupled SCR 112 falls slightly below (but is substantially equal to) the plot 350 of target NOx conversion efficiency for close coupled SCR unit 112 at a plurality of temperatures. FIG. 4B also shows that plot 376 of the NOx conversion efficiency of the downstream SCR 104 at a plurality of temperatures determined at step 256 falls below plot 370 of target NOx conversion efficiency for downstream SCR unit 104 by an amount that is greater than the amount plot 356 falls below the target NOx conversion efficiency plot 350 for the close coupled SCR unit 112.

In accordance with the embodiment of FIG. 2, FIGS. 4A and 4B illustrate NOx conversion efficiency of close coupled SCR 112 and the NOx conversion efficiency of downstream SCR 104 vary from their respective target NOx conversion efficiency (plots 350 and 370) by different amounts (e.g., the amount they vary from their respective target NOx conversion efficiency is substantially unequal). Stated another way, FIGS. 4A and 4B illustrate NOx conversion efficiency of close coupled SCR 112 (plot 356) differs from (e.g., falls below) its target NOx conversion efficiency (plot 350) by an amount that is different from (i.e., substantially unequal) an amount the NOx conversion efficiency of the downstream SCR 104 (plot 376) differs from its target NOx conversion efficiency (plot 370). In accordance with some disclosed embodiments, the results of such comparison are used to evaluate quality of DEF dosed to the EAS at step 260. In other embodiments, results of such comparison are used to evaluate whether other components or parameters common to the dosing of DEF to both the close coupled SCR 112 and downstream SCR 104 are possibly operating ineffectively. In accordance with some embodiments, when the actual NOx conversion efficiency of the close coupled SCR 112 and the actual NOx conversion efficiency of the downstream SCR 104 fall below their target NOx conversion efficiency (plots 350 and 370) by an amount that is unequal (as shown in FIGS. 4A and 4B), method 248 determines that a component or parameter common to the dosing of DEF to both the close coupled SCR 112 and downstream SCR 104 is unlikely to be operating ineffectively. As noted above, one example of a parameter common to the dosing of DEF to both the close coupled SCR 112 and downstream SCR 104 is quality of DEF. Other examples of a DEF dosing component or parameter common to both close coupled SCR 112 and downstream SCR 104 include a pump or lines used to flow DEF from a common DEF source to both SCR units. In accordance with some embodiments, when the difference between the actual NOx conversion efficiency of the close coupled SCR 112 and its target NOx conversion efficiency and the difference between the actual NOx conversion efficiency of downstream SCR 104 and its target NOx conversion efficiency are unequal, e.g., fall below their respective target NOx conversion efficiency by an amount that is unequal, method 248 determines DEF quality or malfunction of a common DEF delivery component are unlikely to be operating ineffectively and are not a cause of the reduced actual NOx conversion efficiency (i.e., below target NOx conversion efficiency). In an EAS where both close coupled SCR 112 and downstream SCR 104 receive DEF from the same source utilizing the same components (e.g., pump and lines), a decrease in actual NOx conversion efficiency of the close coupled SCR 112 that is not substantially equal to a decrease in actual NOx conversion efficiency of the downstream SCR 104 indicates that components or parameters common to DEF dosing to both SCR units (e.g., concentration of reductant in DEF, DEF pumps or lines that serve both SCR units) are unlikely to be operating ineffectively because the reduction in NOx conversion efficiency of the SCR units is unequal. In other embodiments, the method determines a component or parameter associated with DEF dosing that is not common to both SCR units may be operating ineffectively and contributing to the reduction in NOx conversion efficiency for one of the SCR units and not the other.

As used in the foregoing paragraph, the phrase "unequal" is not limited to a specific difference between the amount plots 350 and 356 differ from each other and the amount plots 370 and 376 differ from each other at specific temperatures. Examples of unequal include a difference between the amount plots 350 and 356 differ from each other and the amount plots 370 and 376 differ from each other that is more than 2.5%, more than 5%, more than 7.5%, more than 10%, more than 12.5%, more than 15%, more than 17.5% or more than 20%. Embodiments in accordance with the present disclosure not limited to differences between the amount plots 350 and 356 differ from each other and the amount plots 370 and 376 differ from each other that is more than 2.5% to be unequal, for example, in other embodiments the difference between the amount plots 350 and 356 differ from each other and the amount plots 370 and 376 differ from each other is unequal when the difference is less than 2.5%

In accordance with one or more embodiments of the present disclosure, method 248 starts at step 250 upon a determination that the amount of DEF in a DEF tank of the EAS has changed. A change which would initiate step 250 includes a change in the amount of DEF in a DEF tank of more than 5%, more than 10%, more than 15%, more than 20%, or more than 25%. Embodiments in accordance with the present disclosure are not limited to a change of the foregoing amounts in order to initiate step 250. For example, step 250 may be initiated when the amount of DEF in a DEF tank changes by less than 5%.

Figure 5:
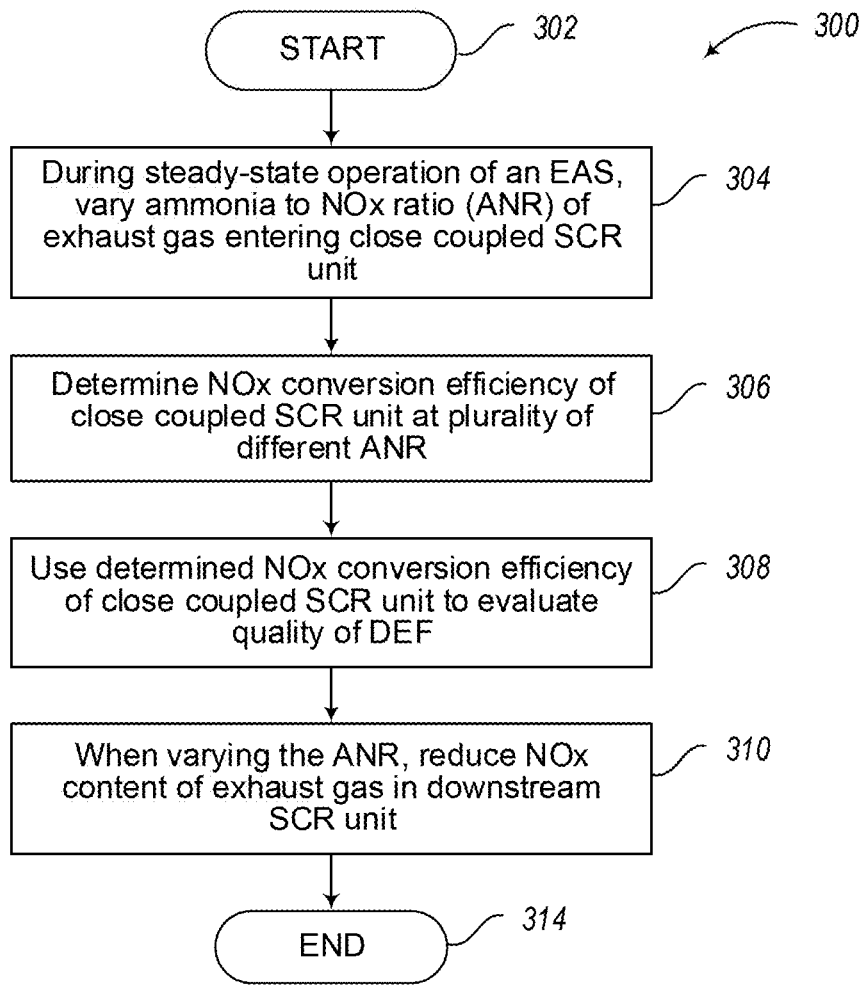
FIG. 5 is a flow diagram of a method of evaluating DEF quality according to one non-limiting illustrated embodiment.

Referring to FIGS. 5, 1B and 1C, in accordance with an embodiment of the present disclosure, a method 300 of evaluating DEF quality in an emission after treatment system (EAS) including a close coupled selective catalytic reduction (SCR) unit 112 and a downstream (e.g., underbody) SCR unit 104 starts at step 302. In accordance with method 300, at step 302 during steady-state operation of the EAS, an ammonia to NOx ratio (ANR) of exhaust gas entering close coupled SCR 112 is varied. The ANR is varied by adjusting the amount of DEF dosed to the exhaust gas entering close coupled SCR 112. Embodiments in accordance with the present disclosure are not limited to a particular range across which the ANR is varied. In a broad sense, the ANR is varied from a lean ANR to a rich ANR. Examples of a lean ANR refers to ANR values below one and examples of a rich ANR refers to ANR values above one. In accordance with this embodiment, NOx conversion efficiency of a close coupled SCR 112 is determined, as described above, at the plurality of different ANR values at step 306. At step 308, the determined NOx conversion efficiency of close coupled SCR 112 at the plurality of different ANR is used to evaluate quality of DEF as described below in more detail. In accordance with this embodiment, when the ANR of the exhaust gas entering close coupled SCR 112 is varied, the NOx content of the exhaust gas exiting the EAS is reduced by downstream SCR 104. In some embodiments, downstream SCR 104 removes sufficient NOx from the exhaust gas such that the exhaust gas exiting the EAS complies with regulatory limits. For example, during the varying of ANR of exhaust gas into close coupled SCR and determination of the NOx conversion efficiency at a plurality of ANR, downstream SCR 104 removes at least 80% or more, 85% or more, 90% or more, 95% or more or 99% or more of the NOx in the exhaust gas entering the close coupled SCR 112. In other embodiments, the downstream SCR 104 removes sufficient NOx such that the EAS emits no more than 0.02 g/bhp-hr of NOx. The method illustrated in FIG. 5, ends at step 314.

In this embodiment of FIG. 5, the EAS is operated at one or more steady state conditions. Steady-state conditions of the EAS are described above and are not reproduced here.

In accordance with this embodiment of FIG. 5, and NOx conversion efficiency of close coupled SCR 112 at the plurality of different ANR. The plurality of different ANR are achieved by adjusting the amount of DEF dosed to the exhaust gas upstream of close coupled SCR 112. Embodiments in accordance with the present disclosure are not limited to determining NOx conversion efficiency of the close coupled SCR 112 at a plurality of different ANR. In some embodiments, NOx conversion efficiency for the close coupled SCR 112 at a single ANR is determined and used to evaluate quality of DEF dosed to the EAS in accordance with embodiments of the present disclosure.

In this embodiment, the EAS is operated at one or more steady state conditions, other than the ANR. Steady-state conditions of the EAS include one or more of a substantially constant volumetric flow of exhaust gas through the close coupled SCR 112, a substantially constant catalyst bed temperature in close coupled SCR 112 and a substantially constant NOx content of the exhaust gas flowing to the close coupled SCR unit 112. Embodiments in accordance with the present disclosure are not limited to the foregoing described steady-state conditions of the EAS. Embodiments in accordance with the present disclosure include those that evaluate quality of DEF dosed to an EAS at one or more steady-state conditions other than those expressly described above.

In accordance with this embodiment of FIG. 5, using the determined NOx conversion efficiency of the close coupled SCR 112 to evaluate quality of DEF includes step 308 of comparing the determined NOx conversion efficiency of the close coupled SCR 112 (under evaluation) at different ANR to a target or known NOx conversion efficiency for the close coupled SCR 112 at the different ANR. The target or known NOx conversion efficiency at different ANR for the close coupled SCR 112 is determined as described below. In accordance with some embodiments, the target or known NOx conversion efficiency of close coupled SCR 112 at a plurality of different ANR is based on previously determined NOx conversion efficiency of an SCR catalyst unit including the same volume and type of catalyst as the close coupled SCR 112 being evaluated. When quality of DEF dosed to the EAS including the close coupled SCR being evaluated is satisfactory, (e.g., the same or similar to the quality of the DEF used to generate the known NOx conversion efficiency for the close coupled SCR being evaluated), the NOx conversion efficiency vs ANR plot for the close coupled SCR 112 being evaluated will be substantially the same as or similar to the plot of known NOx conversion efficiency vs ANR for the SCR 112 being evaluated. In contrast, when quality of DEF dosed to the EAS including the close coupled SCR 112 being evaluated is not satisfactory, e.g., the DEF has been diluted relative to the DEF used to generate the plot of known NOx conversion efficiency vs ANR for SCR 112 being evaluated, the plot of NOx conversion efficiency versus ANR for SCR 112 being evaluated will be not be congruent with or substantially the same as the plot of the known NOx conversion efficiency versus ANR for the being evaluated. In accordance with the embodiment of FIG. 5, when the plot of NOx conversion efficiency for SCR 112 is not congruent with or not substantially similar to the plot of known NOx conversion efficiency for SCR 112, method 300 determines that the quality of the DEF dosed to EAS is compromised, e.g., has been diluted or has had unwanted components added to the DEF tank. In some embodiments, when method 300 determines the quality of DEF dosed to the EAS is compromised (i.e., diluted), either corrective actions are taken, e.g., increasing the dosing of the DEF so as to increase the ANR. Such corrective actions may be continued until such time that a preset upper limit on the value of the corrective action is reached, at which time in accordance with some embodiments of the present disclosure, a signal is generated indicating a potential malfunction of the EAS. Alternatively, the signal indicating a potential malfunction of the EAS is issued after the method determines DEF quality may have been compromised and before corrective action is taken. In contrast, when the plot of NOx conversion efficiency for SCR is congruent with or substantially similar to the plot of known NOx conversion efficiency for SCR 112, method 300 determines the quality of the DEF dosed to the EAS has not been compromised and is similar in quality to the DEF used to generate the known NOx conversion efficiency for SCR 112.

In accordance with some embodiments of the present disclosure, the known NOx conversion efficiency at the plurality of different ANR is previously determined using an SCR catalyst unit including the same volume and type of catalyst as used in the close coupled SCR 112 under evaluation as described above. In addition, in some embodiments the catalyst of the SCR unit from which the target NOx conversion efficiency is generated has been aged to approximate the age of the catalyst in the close coupled SCR 112 under evaluation. Such aging of the catalyst can be achieved by exposing the catalyst to elevated temperatures for extended periods of time. In one embodiment, the known NOx conversion efficiency of a SCR unit including the same volume and type of catalyst as the close coupled SCR 112 under evaluation is determined on a bench testing unit. Embodiments in accordance with the present disclosure are not limited to determining the known NOx conversion efficiency as a function of ANR on a bench testing unit. For example, in some embodiments, the known NOx conversion efficiency as a function of ANR is determined by means other than a bench testing unit, e.g., from monitoring the NOx conversion efficiency at a plurality of ANR for a close coupled SCR unit in a real world installation, e.g., on a vehicle.

In accordance with this embodiment of the present disclosure, the known NOx conversion efficiencies at a plurality ANR for the close coupled SCR unit 112 are stored in one or more lookup tables as a function of age of the catalyst used to generate the known NOx conversion efficiency values. The age variable in the lookup table can be hours of operation of SCR unit used to generate the known NOx conversion efficiencies, volume of exhaust gas treated by the SCR unit used to generate the known NOx conversion efficiencies, hours an internal combustion engine connected to the SCR unit was operated at an RPM above idling RPMs or some other measure of catalyst age.

Figure 6:
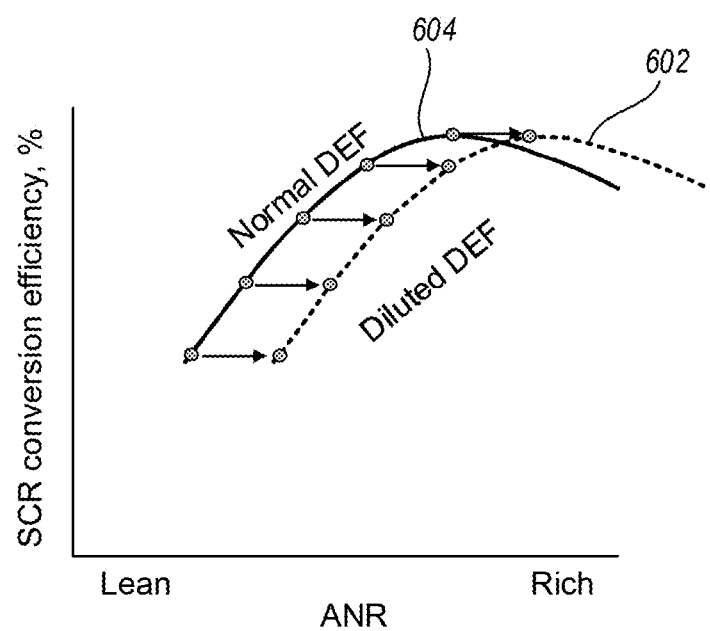
FIG. 6 is a plot of SCR conversion efficiency as a function of ammonia to NOx ratio in accordance with a non-limiting illustrated embodiment.

An example of known NOx conversion efficiency for a close coupled SCR 112 at differing ANR is illustrated in FIG. 6 as plot 604. The known NOx conversion efficiency for close coupled SCR 112 reflected in FIG. 6 is determined as described above. These known NOx conversion efficiency values for close coupled SCR 112 are determined at a plurality of different ANR. Plot 604 in FIG. 6 is generated using DEF of an acceptable concentration of reductant, e.g., about 32.5% urea. FIG. 6 also includes a plot 602 of NOx conversion efficiency for close coupled SCR 112 versus ANR (broken line) determined for close coupled SCR 112 while operating the EAS including a close coupled SCR 112 at steady-state conditions. Plot 602 is generated by varying the amount of DEF dosed to the exhaust gas (which results in a varying ANR) upstream of the close coupled SCR 112 under evaluation and determining the NOx conversion efficiency (using the method described above) at the various dosing levels/ANR.

In accordance with one or more embodiments of the present disclosure, method 300 starts at step 302 upon a determination that the amount of DEF in a DEF tank of the EAS has changed. A change which would initiate step 302 includes a change in the amount of DEF in a DEF tank of more than 5%, more than 10%, more than 15%, more than 20%, or more than 25%. Embodiments in accordance with the present disclosure are not limited to a change of the foregoing amounts in order to initiate step 302. For example, step 302 may be initiated when the amount of DEF in a DEF tank changes by less than 5%.

Figure 7:
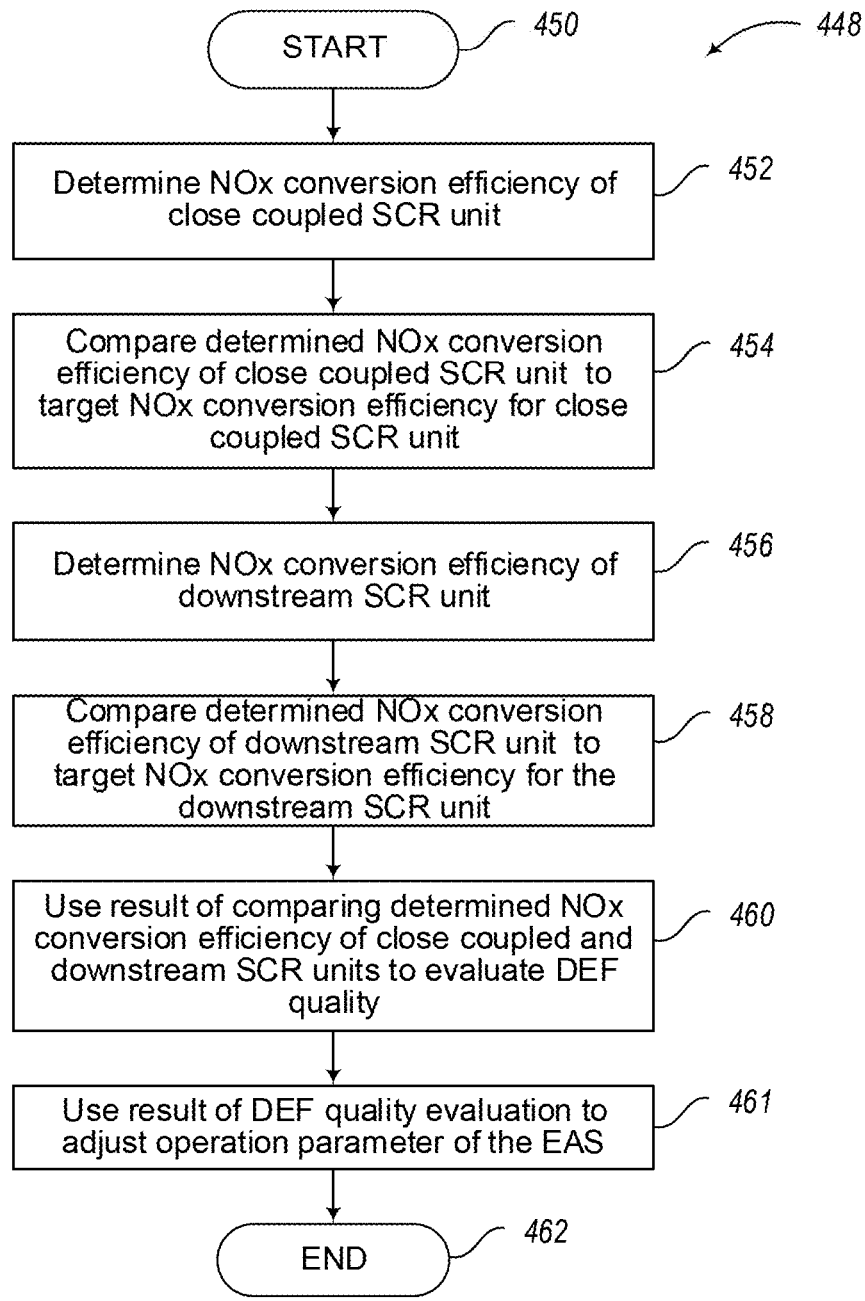
FIG. 7 is a flow diagram of a method of operating an emission aftertreatment system that includes two or more SCR units, according to one non-limiting illustrated embodiment.

Referring to FIGS. 1B, 1C and 7, a method 448 of operating an emission aftertreatment system (EAS) that includes two or more selective catalytic reduction units in accordance with embodiments of the present disclosure is illustrated. Method 448 includes steps 450, 452, 454, 456, 458, and 460 that are similar to steps 250, 252, 254, 256, 258, 260 and 262 described above with reference to FIG. 2. The description of steps 250, 252, 254, 256, 258, 260 and 262 with reference to FIG. 2 are equally applicable to steps 450, 452, 454, 456, 458, and 460 of FIG. 4 and are not repeated here. Method 448 further includes a step 461 of using the results of the evaluation of DEF quality to adjust one or more operational parameters of the EAS (e.g., amount of DEF dosed to EAS) or internal combustion engine. In some embodiments, limits are placed on the amount of adjustment in operation parameters, such as a limit how much the dosing of DEF to the EAS can be increased, such that once such limits are reached, method 500 issues a signal indicating DEF quality may have been compromised. Operational parameters of the internal combustion engine or the EAS in addition to those expressly listed above can be adjusted in accordance with the present disclosure.

In accordance with one or more embodiments of the present disclosure, method 448 starts at step 450 upon a determination that the amount of DEF in a DEF tank of the EAS has changed. A change which would initiate step 450 includes a change in the amount of DEF in a DEF tank of more than 5%, more than 10%, more than 15%, more than 20%, or more than 25%. Embodiments in accordance with the present disclosure are not limited to a change of the foregoing amounts in order to initiate step 450. For example, step 450 may be initiated when the amount of DEF in a DEF tank changes by less than 5%.

Figure 8:
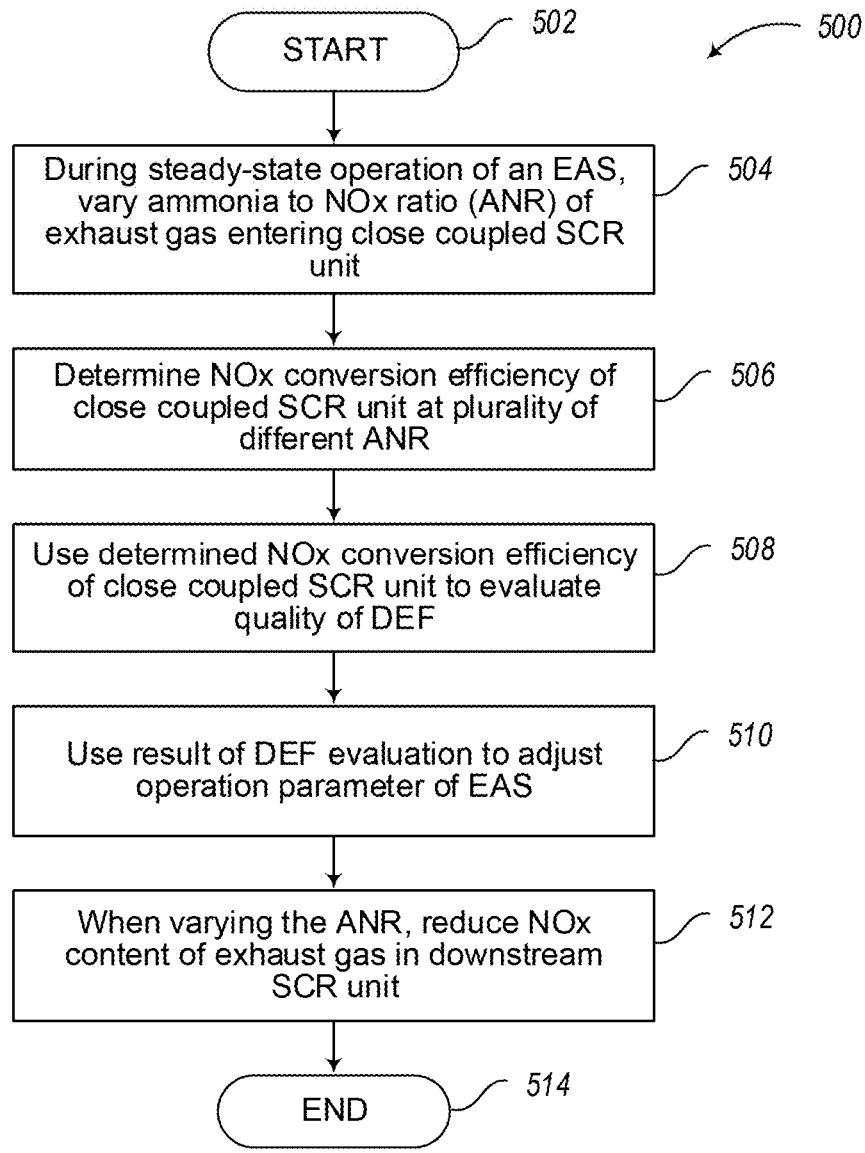
FIG. 8 is a flow diagram of a method of operating an emission aftertreatment system that includes two or more SCR units, according to one non-limiting illustrated embodiment.

Referring to FIGS. 1B, 1C and 8, a method of operating an EAS in accordance with another embodiment of the present disclosure is illustrated. In FIG. 8, a method 500 of operating an internal combustion engine emissions aftertreatment system (EAS), including a close coupled SCR unit 112 and a downstream SCR unit 104 in accordance with a disclosed embodiment is illustrated. Method 500 includes steps 502, 504, 506, 508, 512 and 514 that are similar to steps 302, 304, 306, 308, 310 and 314 described above with reference to FIG. 5. The description of steps 302, 304, 306, 308, 310 and 314 with reference to FIG. 5 are equally applicable to steps 502, 504, 506, 508, 512 and 514 of FIG. 8 and are not repeated here. Method 500 further includes a step 510 of using the result of the evaluation of DEF quality to adjust operation parameters of the internal combustion engine or the EAS (e.g., amount of DEF dosed to the EAS). In some embodiments, limits are placed on the amount of adjustment in operation parameters, such as a limit how much the dosing of DEF to the EAS can be increased, such that once such limits are reached, method 500 issues a signal indicating DEF quality may have been compromised. Operational parameters of the internal combustion engine or the EAS in addition to those expressly listed above can be adjusted in accordance with the present disclosure.

In accordance with one or more embodiments of the present disclosure, method 500 starts at step 502 upon a determination that the amount of DEF in a DEF tank of the EAS has changed. A change which would initiate step 502 includes a change in the amount of DEF in a DEF tank of more than 5%, more than 10%, more than 15%, more than 20%, or more than 25%. Embodiments in accordance with the present disclosure are not limited to a change of the foregoing amounts in order to initiate step 502. For example, step 502 may be initiated when the amount of DEF in a DEF tank changes by less than 5%.

In accordance with the embodiments of FIGS. 7 and 8, at step 461 in FIG. 7 and step 510 in FIG. 8, one or more operation parameters of the EAS or internal combustion engine 20 are adjusted based on the results of the evaluation of DEF quality or operation of other DEF dosing components or parameters. Examples of such one or more operation parameters of the EAS or internal combustion engine include dosing rate of diesel exhaust fluid to an upstream SCR catalyst unit, dosing rate of diesel exhaust fluid to a downstream SCR catalyst unit, temperature of the upstream SCR catalyst unit, temperature of the downstream SCR catalyst unit, load on the internal combustion engine, temperature of exhaust gas from the internal combustion engine, volumetric flow of air through the internal combustion engine, volumetric flow rate of exhaust gases, air/fuel to engine ratio, temperature of air flow to the engine, temperature of the engine, an operating speed of the internal combustion engine 20 (e.g., in RPM) and level of exhaust gas recirculation (EGR). Embodiments in accordance with the present disclosure are not limited to the foregoing operational parameters. Operational parameters of the internal combustion engine or the EAS in addition to those expressly listed above can be adjusted in accordance with the present disclosure.

Figure 9:
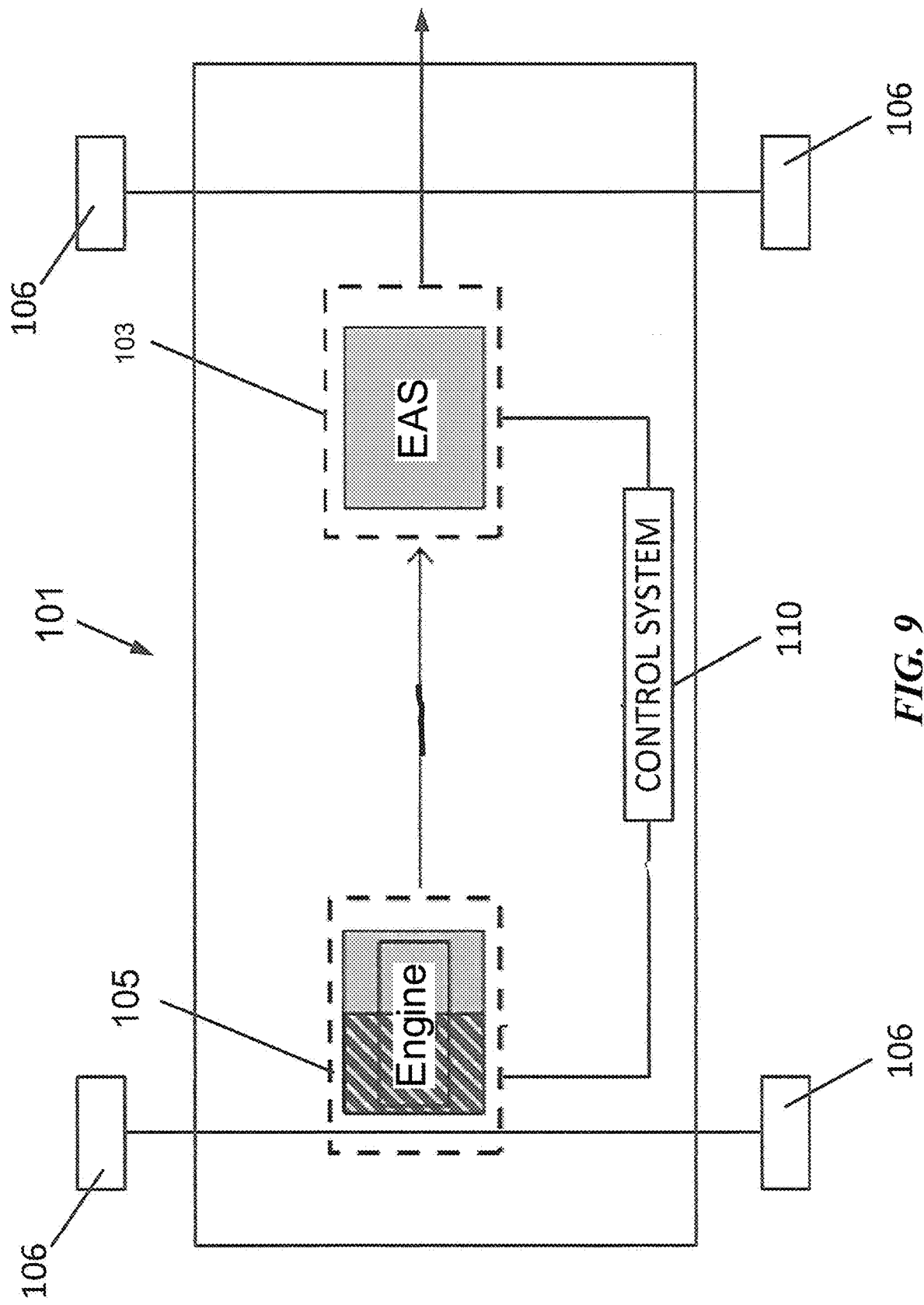
FIG. 9 illustrates a vehicle including an internal combustion engine, an emission aftertreatment system and a control system configured to control components of the engine and emission aftertreatment system according to certain methods in accordance with one non-limiting illustrated embodiment.

FIG. 9 illustrates a schematic diagram of a vehicle 101, which may be a heavy-duty vehicle, with an internal combustion engine 105, which may be a diesel engine, an exhaust after-treatment system 103, a set of at least four wheels 106 configured to be powered and driven by the engine 105, and a control system 110, which can perform the methods described herein. When the vehicle 101 is in operation, the control system 110 is used to control operation of portions of the vehicle 101, including its internal combustion engine 105 and its emission after-treatment system 103. For example, the control system 110 may be configured to control the engine 105 to idle with any number of its cylinders firing and any number of its cylinders deactivated, to control the engine 105 to increase the load on the engine 105, for example by driving an electric generator (not shown), to direct electrical energy generated by the electrical generator into an exhaust gas stream at a location between the engine 105 and the emission after-treatment system 103, to increase or decrease the temperature of the gases exhausted from the engine and/or to increase or decrease the volumetric flow of air through the engine. These examples of functions the control system 110 controls or initiate control of are not exhaustive. The control system 110 in accordance with embodiments of the present disclosure may be able to control or initiate other functions of the engine or vehicle.

As another example, the control system 110 may be configured to control or initiate control of the exhaust after-treatment system 103 and components thereof, including a diesel oxidation catalyst (DOC) unit to oxidize unburned fuel and carbon monoxide, a diesel particulate filter (DPF) to control particulate matter (PM), a selective catalytic reduction (SCR) system or unit to reduce oxides of nitrogen (NOX), and an ammonia oxidation catalyst (AMOX) system. For example, in some embodiments, the control system 110 is configured to control an amount of thermal energy introduced into the gas exhausted by the engine, to control the dosing rate of diesel exhaust fluid to the EAS and/or to control temperature of an upstream or downstream SCR unit.

In some embodiments, the vehicle 101 includes a plurality of sensors that collect and transmit data regarding operating parameters of the vehicle 101 and/or operating parameters of the EAS to the control system 110, such as continuously. For example, such sensors may collect and transmit data regarding an exhaust gas temperature at various locations within the EAS, volumetric flow rate of exhaust gases, volumetric air flow rate to engine, fuel/air ratio to engine, temperature of air flow to engine, NOx content of the exhaust gas entering an SCR unit, NOx content of exhaust gas exiting an SCR unit, volumetric flow of DEF dosing, temperature of the engine, an operating speed of the internal combustion engine 102 (e.g., in RPM) to the control system 110, load on the engine, temperature of SCR unit and level of exhaust gas recirculation (EGR). In some embodiments, the control system 110 may control operation of the vehicle 101, such as in accordance with any of the techniques described herein, based on such measurements and data, such as when such measurements fall below certain specified thresholds, e.g., when the exhaust gas temperature falls below any of the exhaust gas temperatures mentioned herein, such as 190° F., or when the internal combustion engine 102 is idling, as identified, for example, when the operating speed of the internal combustion engine 105 falls below 550 RPM, or 600 RPM, or 650 RPM, or 700 RPM, or 750 RPM, or 800 RPM.

Figure 10:
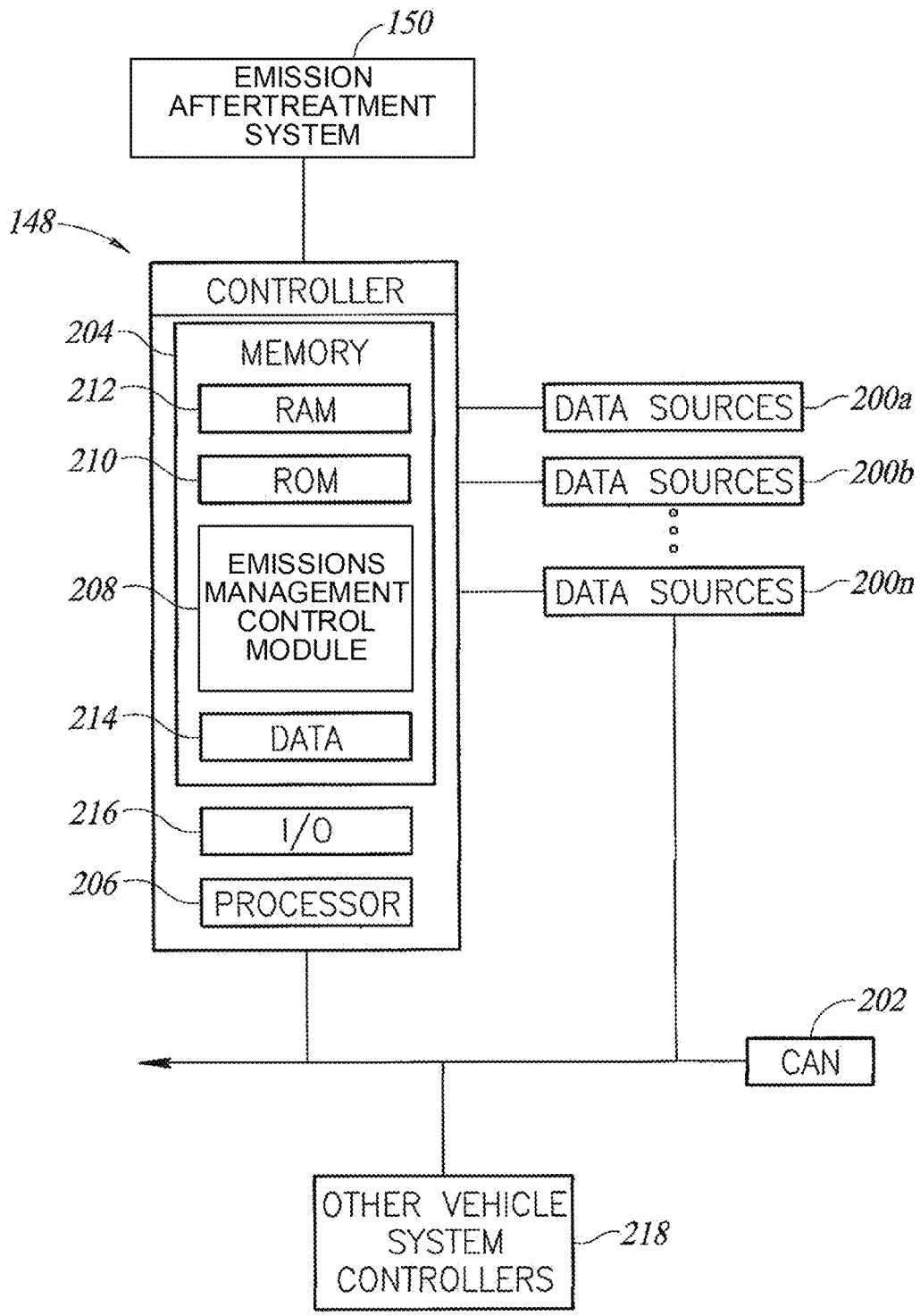
FIG. 10 is a schematic block diagram of an emission management system in accordance one non-limiting illustrated embodiment.

FIG. 10 shows one non-limiting example of an emissions aftertreatment system controller 148 formed in accordance with aspects of the present disclosure and can be part of the control system 110. The control system may be an emissions management system associated with an EAS system of a vehicle powered by an internal combustion engine or an EAS of an internal combustion engine implemented in a stationary application. The controller 148 is connected in electrical communication with a plurality of data sources 200a-200n (generally, data sources 200). As will be described in more detail below, the data sources 200 may include but are not limited to on-board sensors, e.g., engine sensors and EAS sensors, on-board state estimators, etc. It will be appreciated that the controller 148 can be connected directly (wired or wirelessly) to the plurality of data sources 200 or indirectly via any suitable interface, such as a CAN interface 202. Those skilled in the art and others will recognize that the CAN 202 may be implemented using any number of different communication protocols such as, but not limited to, Society of Automotive Engineers ("SAE") J1587, SAE J1922, SAE J1939, SAE J1708, and combinations thereof. The controller 148 may also communicate with other electronic components of the vehicle 101 via the CAN 202 for collecting data from other electronic components to be utilized by the controller 148, and as such, can also be considered in at least some embodiments as data sources 200. For example, the controller 148 may receive data from one or more other controllers 218, such as an engine controller, a transmission controller, a brake system controller, etc. In operation, as will be described in more detail below, the controller 148 receives signals from the data sources 200, processes such signals and others, and depending on the processed signals, transmits suitable control signals for operating the EAS 150, the engine 105 or other systems or components of the vehicle 101. The controller 148 initiates operation by means of a hard wired input (e.g. ignition key 154) or by receiving a signal from a communication network (e.g. wake-up on CAN). This wake-up message allows to bring the controller 148 in operation, whereas the operator does not need to use the ignition keys or be physically in or near the vehicle 101. The controller 148 may be a standalone controller or may be part of one or more other controllers (e.g., vehicle electronic control unit (VECU)) of the vehicle 101. Generally, the emission aftertreatment system may be implemented in any local or remote controller(s) operative to provide the functionality described herein.

In at least some embodiments, the controller 148 may contain logic rules implemented in a variety of combinations of hardware circuitry components and programmed processors to effect control of the EAS 150 and other systems of the vehicle 101. To that end, as further illustrated in FIG. 10, one suitable embodiment of the controller 148 includes a nontransitory memory 204, a processor 206, and emissions management control module 208 for providing functionality of the controller 148. The memory 204 may include computer readable storage media in read-only memory (ROM) 210 and random-access memory (RAM) 212, for example. The computer-readable storage media may be implemented using any of a number of memory devices such as PROMs (programmable read-only memory), EPROMs (electrically PROM), EEPROMs (electrically erasable PROM), flash memory, or any other electric, magnetic, optical, or combination memory devices capable of storing data, including data 214 (e.g., programmable parameters or a look up table of NOx conversion efficiency at a plurality of SCR unit temperatures or a plurality of ANR for catalysts of different ages). The controller 148 also includes one or more input/output devices or components 216 that enable the controller to communicate with one or more local or remote devices via wired or wireless communication. In at least some embodiments, the controller 148 may include additional components including but not limited to a high speed clock, analog to digital (A/D) and digital to analog (D/A) circuitry, other input/output circuitry and devices (I/O), and appropriate signal conditioning and buffer circuitry.

As used herein, the term processor is not limited to integrated circuits referred to in the art as a computer, but broadly refers to one or more of a microcontroller, a microcomputer, a microprocessor, a central processing unit (CPU), a graphics processing unit (GPU), a programmable logic controller, an application specific integrated circuit, other programmable circuits, combinations of the above, among others. In at least one embodiment, the processor 206 executes instructions stored in memory 204, such as engine restart control module 208, to implement the functionality described in the present disclosure.

The emissions management control module 208 may include a set of control algorithms, including program instructions, selectable parameters, and calibrations stored in one of the storage media and executed to provide functions described herein. Information transfer to and from the module 208 may be accomplished by way of a direct connection, a local area network bus, a serial peripheral interface bus, wired or wireless interfaces, etc. The algorithms may be executed during preset loop cycles such that each algorithm is executed at least once each loop cycle. Algorithms stored in the non-volatile memory devices may be executed by the processor 206 to monitor inputs from the sensing devices and other data transmitting devices or polls such devices for data to be used therein. Loop cycles may be executed at regular intervals during ongoing operation of the vehicle 101. Alternatively or additionally, algorithms may be executed in response to the occurrence of one or more events.

The processor 206 communicates with various data sources 200 directly or indirectly via the input/output (I/O) interface 216 and suitable communication links. The interface 216 may be implemented as a one or more integrated interfaces that provide various raw data or signal conditioning, processing, and/or conversion, short-circuit protection, and/or the like. Additionally or alternatively, one or more dedicated hardware or firmware chips may be used to condition and process particular signals before being supplied to the processor 206. In at least some embodiments, the signals transmitted from the interface 216 may be suitable digital or analog signals.

The controller 148 may be a separate controller that implements the EAS management functionality described herein. However, it should be appreciated that the controller 148 may be a controller module, which could be software embedded within an existing on-board controller, such as the engine controller, a general purpose controller, other vehicle system controllers, etc.

As briefly described above, the data sources 200 can include but are not limited to on-board sensors for detecting operation parameters of an EAS, navigation/GPS devices, communications devices, data stores, remote servers, etc. These data sources and others in at least some embodiments may be part of the electrical systems 138, control console 132, etc., described above. The data supplied from these data sources 200 and others may generally or specifically relate to vehicle operating parameters, e.g., engine or EAS operating parameters, operator driving trends and accessories (e.g., loads 220) usage patterns and characteristics, and external parameters, including present vehicle navigation, traffic patterns, weather data, sunrise and sunset data, temperature data, among others.

One or more implementations of the present disclosure are directed to methods for evaluating quality of DEF fluid dosed to an emission aftertreatment system of an internal combustion engine, for example, a diesel engine of a light-duty or heavy-duty vehicle. In at least some implementations, the systems and methods are operative to evaluate quality of DEF and provide a signal that DEF quality is below standards or may have been compromised. In accordance with some embodiments, results of the evaluation of quality of DEF are used to adjust operational parameters of the EAS, e.g., the dosing amount of DEF. In other embodiments, the results of the evaluation of quality of DEF are used to diagnose whether the DEF has been compromised (e.g., diluted).

In other implementations, embodiments described herein relate to an emissions management system for a vehicle including an internal combustion engine and an EAS. Such systems include a processor, which in operation, determines a NOx conversion efficiency of a close coupled SCR unit and compares determined NOx conversion efficiency of the close coupled SCR unit to a target NOx conversion efficiency for the close coupled SCR unit. The processor further determines a NOx conversion efficiency of a downstream SCR unit and compares the determined NOx conversion efficiency of the downstream SCR unit to a target NOx conversion efficiency for the downstream SCR unit. The processor uses a result of the comparing the determined NOx conversion efficiency of the close coupled SCR unit and a result of the comparing the determined NOx conversion efficiency of the downstream SCR unit to evaluate quality of DEF provided to the EAS.

In other implementations, embodiments described herein relate to an emissions management system for a vehicle including an internal combustion engine and an EAS. Such systems include a processor, which in operation, during steady-state operations of the EAS, causes an ammonia to NOx ratio of an internal combustion engine exhaust gas entering a close coupled SCR unit to be varied. The processor, in operation, determines an NOx conversion efficiency of the close coupled SCR unit at a plurality of different ammonia to NOx ratios of the internal combustion engine exhaust gas and uses the determined NOx conversion efficiency of the close coupled SCR unit at the plurality of different ammonia to NOx ratios to evaluate quality of the DEF provided to the EAS. The processor, in operation, causes a downstream SCR unit to reduce NOx content of the internal combustion engine exhaust gas in the downstream SCR unit when the ammonia to NOx ratio of the internal combustion engine gas entering the close coupled SCR unit is varied and the NOx conversion efficiency of the close coupled SCR at a plurality of ANR is determined.

Although exemplary embodiments of the present disclosure are described hereinafter with reference to a heavy duty truck, it will be appreciated that aspects of the present disclosure have wide application, and therefore, may be suitable for use with many other types of vehicles, including but not limited to light and medium duty vehicles, passenger vehicles, motor homes, buses, commercial vehicles, marine vessels, generator sets, etc. In addition, embodiments of the present disclosure have application with internal combustion engines which are not associated with vehicles. For example, embodiments of the present disclosure have application with internal combustion engines that are utilized in stationary applications, for example, power generation. Accordingly, the foregoing descriptions and illustrations herein should be considered illustrative in nature, and thus, not limiting the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of evaluating DEF quality in an emissions aftertreatment system (EAS) including an upstream selective catalytic reduction (SCR) unit and a downstream SCR unit, the method comprising:
   during steady state operation of the EAS, varying an ammonia to NOx ratio of an internal combustion engine exhaust gas entering the upstream SCR unit;
   determining a NOx conversion efficiency of the upstream SCR unit at a plurality of different ammonia to NOx ratios of the internal combustion engine exhaust gas;
   comparing the determined NOx conversion efficiency of the upstream SCR unit to a target NOx conversion efficiency for the upstream SCR unit;
   evaluating quality of diesel exhaust fluid (DEF) provided to the EAS by directly using a result of the comparing the determined NOx conversion efficiency of the upstream SCR unit to the target NOx conversion efficiency for the upstream SCR unit in the evaluating quality of the diesel exhaust fluid;
   using a result of the evaluating quality of DEF provided to the EAS in adjusting the dosing of the DEF to the EAS; and
   when the ammonia to NOx ratio of the internal combustion engine exhaust gas entering the upstream SCR unit is varied during the steady state operation of the EAS, reducing NOx content of the internal combustion engine exhaust gas in the downstream SCR unit.

2. The method of claim 1, wherein the reducing NOx content of the internal combustion engine exhaust gas in the downstream SCR unit reduces the NOx content of the internal combustion engine exhaust gas entering the upstream SCR unit by 95% or more.

3. The method of claim 1, further comprising initiating the evaluating quality of DEF provided to the EAS after an amount of DEF in a DEF tank of the EAS has changed more than 20 percent.

4. The method of claim 1, further comprising initiating the evaluating quality of DEF provided to the EAS after an amount of DEF in a DEF tank of the EAS has changed more than 10 percent.

5. The method of claim 1, wherein the target NOx conversion efficiency of the upstream SCR unit is obtained from a lookup table.

6. The method of claim 5, wherein the lookup table includes target NOx conversion efficiency values for the upstream SCR unit as a function of age of a upstream SCR unit from which the target NOx conversion efficiency values are generated.

7. The method of claim 1, further comprising initiating a diagnostic signal based on a result of the evaluating quality of DEF provided to the EAS.

8. The method of claim 1, wherein using a result of the evaluating quality of DEF provided to the EAS in adjusting the dosing of the DEF to the EAS includes adjusting the dosing of DEF to the upstream SCR unit.

9. A method of operating an emissions aftertreatment system (EAS) including an upstream selective catalytic reduction (SCR) unit and a downstream SCR unit, the method comprising:
   during steady state operation of the EAS, varying an ammonia to NOx ratio of an internal combustion engine exhaust gas entering the upstream SCR unit;
   determining NOx conversion efficiency of the upstream SCR unit at a plurality of different ammonia to NOx ratios of the internal combustion engine exhaust gas;
   comparing the determined NOx conversion efficiency of the upstream SCR unit to a target NOx conversion efficiency for the upstream SCR unit
   evaluating quality of diesel exhaust fluid (DEF) provided to the EAS by directly using a result of the comparing the determined NOx conversion efficiency of the upstream SCR unit to the target NOx conversion efficiency for the upstream SCR unit in the evaluating quality of the diesel exhaust fluid; and
   using a result of the evaluating quality of DEF provided to the EAS in adjusting dosing of the DEF to the EAS; and
   when the ammonia to NOx ratio of the internal combustion engine exhaust gas entering the upstream SCR unit is varied during the steady state operation of the EAS, reducing NOx content of the internal combustion engine exhaust gas in the downstream SCR unit.

10. The method of claim 9, wherein the using a result of the evaluating quality of DEF provided to the EAS in adjusting the dosing of the DEF to the EAS including adjusting the dosing of DEF to the upstream SCR unit.

11. The method of claim 9, further comprising initiating the evaluating quality of DEF provided to the EAS after an amount of DEF in a DEF tank of the EAS has changed more than 20 percent.

12. The method of claim 9, wherein the reducing NOx content of the internal combustion engine exhaust gas in the downstream SCR unit reduces the NOx content of the internal combustion engine exhaust gas entering the close coupledupstream SCR unit by 95% or more.

13. The method of claim 9, further comprising initiating the evaluating quality of DEF provided to the EAS after an amount of DEF in a DEF tank of the EAS has changed more than 10 percent.

14. The method of claim 9, wherein the target NOx conversion efficiency of the upstream SCR unit is obtained from a lookup table and the lookup table includes target NOx conversion efficiency values for the upstream SCR unit as a function of age of a upstream SCR unit from which the target NOx conversion efficiency values are generated.

15. The method of claim 9, further comprising initiating a diagnostic signal based on a result of the evaluating quality of DEF provided to the EAS.

\* \* \* \* \*

UNITED STATES PATENT AND TRADEMARK OFFICE
CERTIFICATE OF CORRECTION

| | | |
|---|---|---|
| PATENT NO. | : 11,927,126 B2 | Page 1 of 1 |
| APPLICATION NO. | : 17/965540 | |
| DATED | : March 12, 2024 | |
| INVENTOR(S) | : Charles Wayne Reinhardt Swart et al. | |

It is certified that error appears in the above-identified patent and that said Letters Patent is hereby corrected as shown below:

In the Claims

Column 23, Claim 12, Lines 10-11:
"entering the close coupledupstream SCR"
Should read:
--entering the upstream SCR--.

Signed and Sealed this
Eighteenth Day of June, 2024

Katherine Kelly Vidal
*Director of the United States Patent and Trademark Office*